(12) United States Patent
Child

(10) Patent No.: US 9,697,340 B2
(45) Date of Patent: Jul. 4, 2017

(54) SYSTEM AND METHODS WITH ASSURED ONE-TIME, REPLAY-RESISTANT PASSWORDS

(71) Applicant: GUARDTIME IP HOLDINGS LIMITED, Tortola (VG)

(72) Inventor: Nicholas Child, Torrance, CA (US)

(73) Assignee: GUARDTIME IP HOLDINGS, LTD., Tortola (VG)

( * ) Notice: Subject to any disclaimer, the term of this patent is extended or adjusted under 35 U.S.C. 154(b) by 173 days.

(21) Appl. No.: 14/738,890

(22) Filed: Jun. 14, 2015

(65) Prior Publication Data

US 2016/0364555 A1 Dec. 15, 2016

(51) Int. Cl.
*G06F 21/88* (2013.01)
*G06F 21/31* (2013.01)
*G06F 21/62* (2013.01)

(52) U.S. Cl.
CPC .......... *G06F 21/31* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 2007/0050635 A1* | 3/2007 | Popp ..................... | H04L 9/0863 713/185 |
| 2007/0250923 A1* | 10/2007 | M'Raihi .................. | G06F 21/34 726/18 |
| 2009/0055656 A1* | 2/2009 | Mersh ..................... | G06F 21/79 713/187 |
| 2009/0106561 A1* | 4/2009 | Ejiri ........................ | G06F 21/62 713/193 |
| 2009/0279692 A1* | 11/2009 | Perlman ................ | H04L 9/0643 380/28 |
| 2011/0138192 A1* | 6/2011 | Kocher .................. | G06F 21/602 713/189 |
| 2012/0023566 A1* | 1/2012 | Waterson ................ | G06F 21/56 726/9 |
| 2013/0191899 A1* | 7/2013 | Eldefrawy ............. | H04L 9/3228 726/6 |
| 2014/0082367 A1* | 3/2014 | Lambert ................. | G06F 21/31 713/183 |
| 2015/0113266 A1* | 4/2015 | Wooten ................. | H04L 9/3268 713/156 |

* cited by examiner

*Primary Examiner* — Trang Doan
(74) *Attorney, Agent, or Firm* — Jeffrey Pearce

(57) ABSTRACT

An administrative system generates a sequence of passwords by iterative evaluation of a hash function, initiated from a private key value and continuing to a final, public key value. A current token is created that includes a current one of the passwords. A protected device tests the validity of the current password by inputting it to a hash function sub-chain. The current password is considered valid if, after hashing the current password n+1 times, where n corresponds to the number of tokens previously received, the result is a revealed value, such as a previously verified password of the public key value. At least one unit of a one-time programmable hardware device, such as processor fuses or anti-fuses, is then physically and permanently altered, thereby incrementing a count entry indicating the number of tokens received. The protected device performs a desired action only if the current password is verified.

35 Claims, 2 Drawing Sheets

SYSTEM AND METHODS WITH ASSURED ONE-TIME, REPLAY-RESISTANT PASSWORDS

FIELD OF THE INVENTION

This invention relates to securing devices using one-time passwords.

BACKGROUND

Passwords have become so common in modern life that most people are typically aware of them only when they forget them, or they are stolen. Indeed, in all likelihood, almost all the readers of this disclosure probably had to enter some form of password, either manually or automatically, just to access the computer that downloaded and is displaying it.

By their nature, passwords assume secrecy. Sadly, this assumption is often unjustified. When users are allowed to choose their own passwords, they all too often choose ones laughably easy to predict. One study, for example, showed that the five most commonly used passwords in 2014 in North America were "123456", "password", "12345", "12345678", and "qwerty". Many sites and administrators therefore require, or assign, passwords that are more difficult to predict or determine through brute force, that is, exhaustive computational trial and error. Even this is insufficient in many cases, however; moreover, even the most complicated password is worse than useless if it is stolen, for example, through interception from an issuer or user, through keylogging, hacking of the computer in which it is stored, etc.

In some systems, passwords themselves may have been prudently chosen, but they are still susceptible to replay attacks: If an attacker intercepts some "secure" token or password passed from the system to an intended, authorized user, the attacker might be able to use the token/password over and over.

One way to avoid or at least reduce the risk and damage of password theft is to require some additional, time-limited action or entry of additional information, such as clicking on a link included in a confirmation email, or a secondary code sent through a secondary channel such as sms to the user's phone, obtaining a one-time password (OTP) from a special hardware device such as a dongle, etc. Such methods are sometimes referred to as two-factor authentication (2FA). Requiring a user to go through such a procedure each time he wants to log into or initiate something is often inconvenient, however, and still doesn't eliminate the problem of hacking, or replay attacks; moreover, in systems that use a hardware-based, secondary password generator, the user must also have with him and always protect the dongle or similar device.

In U.S. Pat. No. 8,683,564, Khan, et al., disclose "one-time password authentication with infinite nested hash claims". In that scheme, "a client device [ ] provides a one-time password (OTP) authentication server with certain registration information. The client device generates, via the OTP authentication server, an authenticated OTP with infinite nested hash chains. These generating operations use a first hash function . . . for updating a seed chain, a second hash function . . . for OTP production, an OTP seed number $s_t^{OTP}$ for a $t^{th}$ authentication, and two authentication seeds of numbers $s_{2t-1}^{Auth}$ and $s_{2t-1}^{Auth}$, for the $t^{th}$ authentication."

One problem of existing solutions is the complexity of bookkeeping: Hash chain values, seed value(s), and counters must all be stored and protected against attack, such as alteration of the data used to generate the passwords, or the passwords themselves. Another problem of many current one-time password arrangements is that they require a user to contact some form of administrator, such as a customer support representative, who then sends the one-time password usually over an insecure channel such as through email or as a text message (sms).

What is needed is a way to generate passwords that is at least as secure as existing methods provide, with at least one parameter that is infeasible to hack and alter.

DETAILED DESCRIPTION

Figure 1:
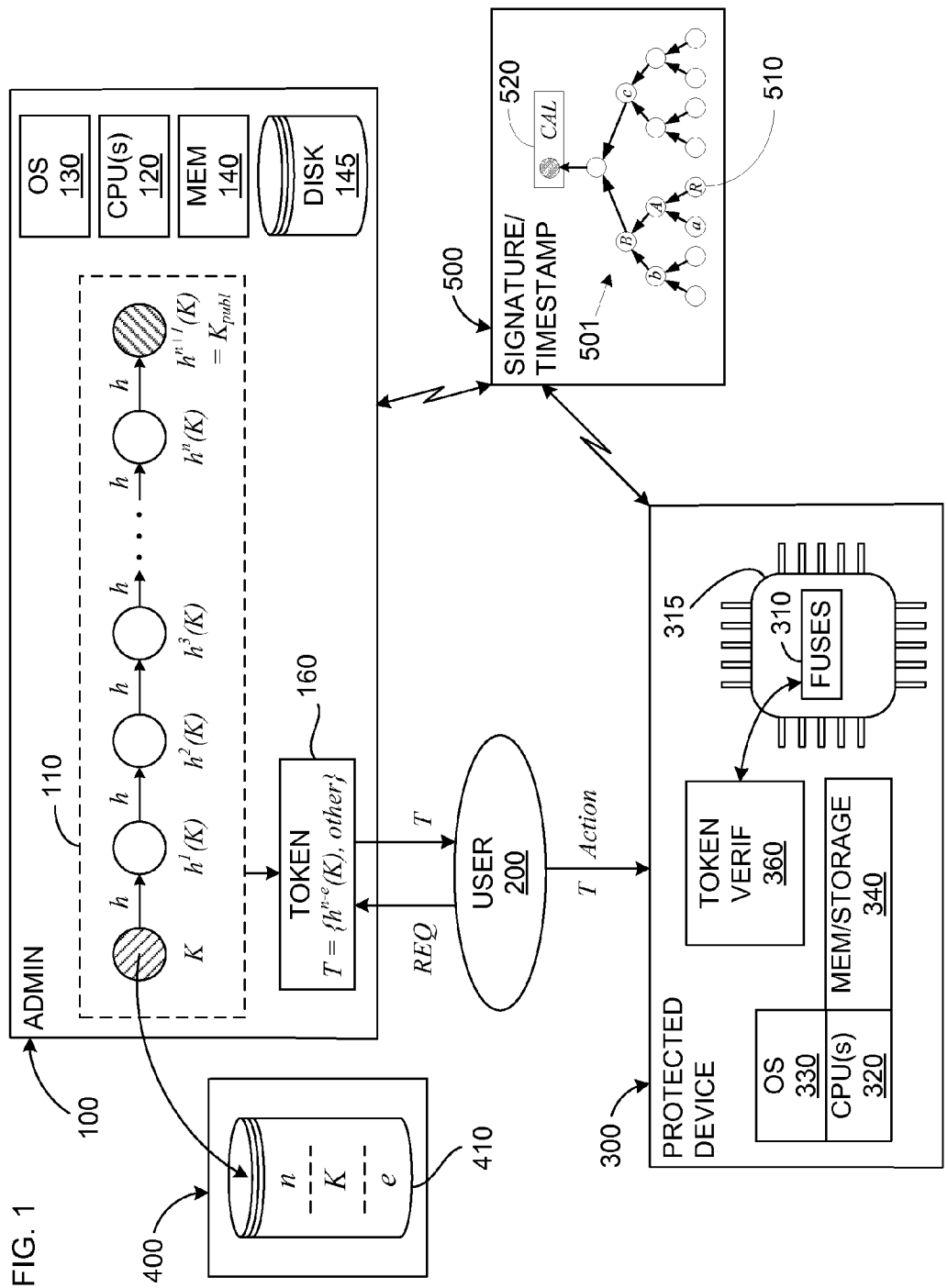
FIG. 1 shows the main aspects of a password-generation system with persistent tokens.

Generally, embodiments of the invention enable one-time, cryptographic, hash chain-created passwords whose reuse is prevented by entries in a one-way programmable storage/memory circuit or device. FIG. 1 illustrates a general structure of an embodiment of the invention. There are countless uses for the invention, but as just one example, various embodiments will be described below primarily in the context of a primary administrative system 100 that is used to create passwords, in the form of tokens T, to authorize some action, for example, by a user 200 with respect to a protected device 300.

The "user" 200 is, here, a computer system, either under human control or totally automatic, and may be either independent, that is, free-standing, or even be a software or hardware component within the administrative system 100 itself. It would even be possible to configure the "user" as one or more components of the protected device 300 itself, although one must then take proper precautions against an attacker being able to compromise both by attacking either. Similarly, the action the user wants to have performed could be anything that requires a password. Without limitation, some examples of actions include accessing a file, machine (including a computer), website, account, etc., activating some process, for example, installing, changing or deleting software or firmware, booting up, enabling a system of any type to begin or proceed or halt some activity, etc. As noted above, passwords are all but ubiquitous in modern life, and this invention may be used in substantially any situation, in particular, where there set of passwords to be made available may be limited.

The administrative system 100 includes a software module 110 that computes a hash chain, which starts with a "seed" or "private key" K, which is cryptographically hashed n+1 times to create n intermediate hash values $h^i(K)$ (i=1, . . . , n), each of which represents a one-time password, and an n+1'th hash value $h^{n+1}(K)$, which forms a public hash value $K_{publ}$. As used here, the function $h^i(K)$ represents successive hashing of K i times. Thus, $h^2(K)=h(h(K))$, $h^3(K)=h(h(h(K)))$, and so on.

Different entities may generate the private key K. For example, the manufacturer of the protected device 300, acting as the trusted entity, may generate and store K securely to ensure that it hasn't been tampered with. In other situations, users may want more control over the password generation process, and might generate K themselves and transmit it to the administrative system as the initial value for computation of the password hash chain and the public value $K_{publ}$.

Any known cryptographic hash function may be used as the function h( ). One of the many suitable choices will be a function computed according any of the well-known Secure Hash Algorithms (SHA), such as SHA-256, SHA-512, etc. As is well known, for a cryptographic hash function $f$ of sufficient output bit length, the probability of collision is very small, that is, given one input message m1 and its hash $f$(m1), the probability that an arbitrary different message m2 will have the same hash value $f$(m2)=$f$(m1), is very small. Moreover, cryptographic hash functions are computationally infeasible to invert; thus, given $f$(x), it is practically impossible to determine x=$f^{-1}$($f$(x)).

Assuming that the cryptographic hash function h( ) is known, and the public hash value $K_{publ}$=$h^{n+1}$(K) is also made available upon query, a system wishing to validate a presented j'th password P need only perform the computation $h^j$(P). If this value $h^j$(P)=$h^{n+1}$(K), then the password can be assumed to be valid. One advantage of this arrangement is that it is not necessary for the "secret value" K to be stored in the device 300, or to be maintained by the user, in addition to being available to the administrative server 100.

The public hash value $K_{publ}$ is stored within the protected device 300 in a permanent, one-time programmable hardware device, indicated as "fuses" 310, which may be a separate, dedicated device, or a component of a larger device such as a specialized processor. A count of the number of passwords used is also stored in the device 310, as explained more below.

Figure 2:
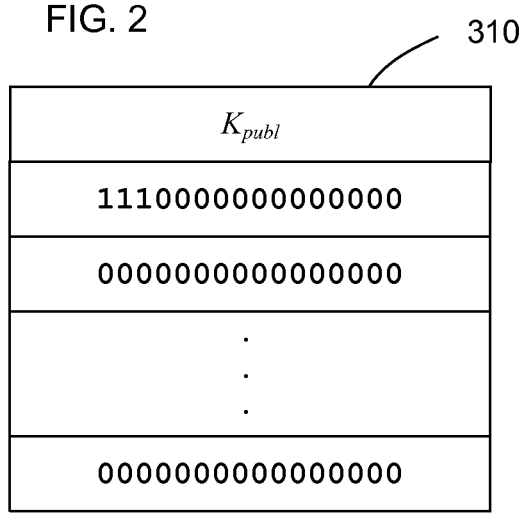
FIG. 2 shows a hardware fuse-based use-tracking mechanism used in embodiments of the invention.

FIG. 2 illustrates an example of values that may be stored in the device 310 when three passwords have been used. Although the particular data structure may of course be adapted to the preferences of the system designer, as illustrated in FIG. 2, the public hash value $K_{publ}$ is stored as one entry. The count of used passwords (in FIG. 2, three) may be maintained by altering the corresponding number of bits of another entry (the "count entry") from their default state, for example, from "0" to "1" or "0" to "1", depending on the device (for example, either "fuse" or "anti-fuse"—see below). Although using single bits as the counter is the most compact, it would also be possible to use multi-bit values to indicate use of each password.

Now let n represent the number of passwords derived from the key K and e be the number of one-time passwords that have been used. The number n of passwords initially generated may be set according to any desired criteria, for example, by the original device manufacturer. The values n, e, and K are stored in a trusted storage device 410, which may be maintained by a trusted party 400, for example, as mentioned above, by the original equipment manufacturer. Note that the administrator of the primary system 100 may itself be the trusted party, in which case the storage device may be included in the administrative system, either as a dedicated storage device or simply as a part of any other storage device included in the system 100 for other purposes as well.

The value e will be indicated by the count entry in the device 310; note that it would be possible to let e indicate the number of generated passwords that remain unused, with changes in the expressions below that will be readily apparent to skilled programmers. Thus, generally, e is a password use indicator, either of the number of passwords used or the number of passwords still available for use. A token module 160 (which may be combined with the module 110) within the administrator system 100 stores and updates (increments or decrements, depending on how e is defined in a given implementation) e after it issues each token.

The administrative system 100 may pre-compute and store all the passwords, that is, all of $h^i$(K) (i=1, . . . , n), such that it can simply retrieve and return the current password. Alternatively, given n, K, and e, the system 100, for example, by means of the hash chain module 110 or token module 160, may compute the currently valid password for use as a current token on demand, by evaluating $h^{n-e}$(K).

Assume now that the user 200 wishes to perform, or have performed, some action with respect to the protected device. Using any known method, such as over any known network, and via any known network interface devices (such as NIC devices) the user may then connect, either directly or indirectly, with the token module 160 and issue a request REQ for a token T. After confirming, using any known method, that the user is authorized to receive tokens, and that unused passwords still remain (e≠n), the token module 160 may return to the user the current token T. As FIG. 1 indicates, the token may include more than just the current password; thus, depending on the implementation, T={$h^{n-e}$(K), other}. Some examples of other values that might be included in a token include a time or timestamp value, a data signature that itself is a function of such parameters as time, the requesting user's ID, or any other values that a designer may choose.

It would also be possible to include, for example, as one of the other values in the token, a possibly "secret" value indicating which action the token may be used to authorize on the device 300. Assume, as just one example, that the device 300 is provided with a pre-stored list of activation codes, each associated with a particular action, or type of action. For example, one action might be "reset"; another might be "update firmware"; another might indicate that the device should enable some feature; etc. The activation codes could even be made specific to a single device 300, for example, by the manufacturer. Even if an attacker were to intercept the current token and attempt to use it before the authorized user, he would therefore not be able to cause any action not associated with the token, and, assuming sufficiently unpredictable, device-specific codes, he would not be able to guess which code he would need to substitute into the token to enable the action he wants instead.

In one embodiment, current passwords $h^{n-e}$(K) are issued in "reverse" computational order. In other words, the first password issued is $h^n$(K), followed by $h^{n-1}$(K), followed by $h^{n-2}$(K), etc., until all of the n passwords in the chain 110 have been used, at which point that chain will no longer provide valid passwords. The advantage of this is that only the public key value $K_{publ}$ and previously issued (and thus invalid) passwords will be involved in the computations. Any attacker who may have intercepted previously issued passwords, or gained access to $K_{publ}$, will therefore have only either deliberately unsecured data ($K_{publ}$) or passwords that will not work. Because of the non-invertiblity of cryptographic hash functions, this information will be no more helpful to "hacking" the currently valid password than would be no information at all.

The user may then submit the received current password to the protected device, and, depending on the situation, possibly also some command or other indication of what action the user wants the protected device to carry out. The protected device may also require conventional user ID verification, such as entry of a username and password associated with and identifying the user. The protected device, for example, using a token verification module 360, may then read from the fuses 310 the value $K_{publ}$, and also count how many bits have been set as the count entry (in FIG. 2, the three "1's"), which gives the value e. The token verification module may then hash the password included in the token e times and compare the result with the public key; the token, that is, the underlying, current password, is valid only if the result and public key are equal. Thus, the protected device knows that the token the user has presented is valid if $h^e$(password in T)=$K_{publ}$. Note that the value n (the number of passwords total) is not required for verification in this embodiment, although other possible verifications formulas might, for example, to confirm that the supply of passwords hasn't already been exhausted.

If the protected device verifies the token the user has submitted, it may then carry out whatever action the user requested. The device 300, again, for example, via the token verification module 360, then sets another bit in the fuses to indicate that another password has been consumed; this effectively increments e.

Given the public hash value $K_{publ}$ and knowledge of the chosen hash function, any entity would be able to determine whether a currently e'th presented password P is valid by repeatedly hashing it e times. For e=1, for example, P is valid if $h(P)=K_{publ}$. In general, any entity—even an attacker—could also determine that an e'th presented password $P_e$ will be valid simply by computing and determining if if $h^e(P_e)=K_{publ}$. In embodiments of the invention, this test is augmented, however, with the further condition that no more than the e'th count indication in the device 310 has been set. Moreover, because passwords are issued in reverse hash chain order, it will be practically impossible for an attacker to determine the next valid password even if he knew every other password ever issued.

The device 310 (the "fuses") may be any type of one-time programmable device, that is, a device that enables one-time, irreversible writing of data. To reduce the possibility that an attacker might be able to physically probe or alter the device to either fake the contents of or even replace the components that store necessary access information, the device 310 is preferably made one-time writable by means of irreversible physical alteration. U.S. Published Patent Application No. 2012/0126363 (Wang, et al., "Structure of metal e-fuse") and U.S. Pat. No. 6,741,117 (Kang-Youl Lee, "Antifuse circuit") are but two examples of prior art technologies that enable a device that allows changes of a hardware bit from a 0 to a 1 (e.g., eFuse) or from a 1 to a 0 (e.g., an "antifuse"). The Intel Westmere CPU includes such fuse capability internally. As these and other public documents explain, to change the state of a fuse bit, an elevated voltage is applied to the physical structure defining the bit, such that a physical and/or electrical path is either broken or established.

Given n passwords, in the worst case, the protected device 300 will have to compute the hash function n times (to verify the $h^1$ password). Even this worst case has an advantage: The protected device does not need to update any state information (such as a most recently verified password), but rather can function with only the public key $K_{publ}$ pre-programmed into the fuses 310. Even in other circumstances, if the total number n of passwords is not too great relative to the available computational power, then the verification delay between receipt of a token from a user and initiation of the requested action may be acceptable. In some cases, however, this may not be possible. For example, rapid verification may be a design requirement.

One option for reducing verification time is for the device to store the most recently verified submitted password, such that only one hash computation will be necessary to verify a currently submitted password. In other words, if the previously verified password is $h^{e-1}(K)$, the token verification module 360 will be able to verify a newly submitted password $h^e(K)$ in a single hash computation, since $h(h^e(K))=h^{e-1}(K)$. One disadvantage of this method is that it is vulnerable to deliberate (in particular, malicious) or inadvertent corruption of the stored, most recently verified password. One option would be for the device to calculate expected values during startup, during idle periods, or as a background process. Stored values may then be validated before they are used, with verified values being held in run-time memory and recalculated/verified on each power-cycle.

In some other cases, it may be advantage to have a value n that is small enough not only to allow for rapid recalculation of n hash values, but also that by design restricts how many actions can be authorized, and does so in a way that causes an actual physical change (setting of the fuses) to enforce the restriction. For example, a manufacturer may require a device to be returned for upgrading, maintenance, inspection, replacement, destruction, etc., after user(s) have exhausted the set of n passwords. The manufacturer might then optionally install a new chip that includes the structure 310, with a reset count entry. The manufacturer might also optionally "burn in" a new public key $K_{publ}$, generated from a new private key K, from which the administrative system can compute a new hash chain and thus a new set of m passwords, where m could be greater than, less than, or equal to the previous number n.

In a basic embodiment, once initially provisioned with the processor-executable code defining the token verification module 360 and any other supporting code, as well as with the public key $K_{publ}$, the protected device 300 may verify passwords and decide whether to initiate requested actions independent of other entities such as the administrative system 100.

Signing and/or timestamping of data may be included in other embodiments, however, to increase security by reducing the risk of a successful man-in-the-middle or other hacking attack. In one example of such an embodiment, the token T returned to the user 200 may include other parameters such as a time of issuance or expiration, a time period of validity, an identifier of the user who has requested the token, an identity of the protected device the token is intended for, etc. Any or all of these parameters, preferably including the current password itself, may be formatted and submitted using any known method, such as over a network, as a record for signature and/or timestamping to an appropriate service/server 500. The user may then submit the signature/timestamp data to the protected device along with the token itself.

Before initiating the user-requested action, the device 300, for example, using the token verification module, may first authenticate the signature and/or timestamp. The method of accomplishing this will depend on the nature of the signature service. In many cases, the device 300 will need to communicate with the signature/timestamp service itself, typically over a network. Assuming the timestamp (if included) is verified, the module 360 may then also (depending on what rules have been included in the system) check whether the actual time falls within any limit, for example, that the password has not expired; if it has expired, then the device can refuse to perform the requested action, possibly sending a failure notice back to the user 200 and/or the administrative system 100.

Any desired type of data signature and/or timestamp may be used. A common choice may be the well-known Public Key Infrastructure (PKI), in which the device and verifying signature sever operate on the basis of a pair of keys, one private and one public, generated based on a valid digital certificate from some certificate authority. The well-known Public Key Infrastructure (PKI) is an example of such a system. One problem with key-based signature schemes is the need to store and maintain the key sets. Yet another problem is that the keys may expire, along with the underlying digital certificates. Another disadvantage of key-based signature schemes is that they require trust of the issuing authority. In the context of the invention, another issue might just which entity is the other half of the PKI "pair" and how and when these keys would be transmitted to the device 300: The device would be the one seeking to authenticate the token via the PKI signature keys, but the original entity requesting the signature will typically be the administrative system 100.

In embodiments of this invention that include data signature and timestamping, the preferred signature and time-stamping mechanism embodied within the system 500 is a distributed, hash tree-based signing infrastructure (the "Guardtime infrastructure") such as is provided by Guardtime AS of Tallinn, Estonia, which is disclosed in U.S. Pat. Nos. 8,347,372; 8,312,528; and 7,698,557 (all Buldas, et al., "System and method for generating a digital certificate") as well as U.S. Pat. No. 8,719,576 (also Buldas, et al., "Document verification with distributed calendar infrastructure"), all of which are incorporated herein by reference.

As a summary, for each of a sequence of calendar periods (typically related one-to-one with physical time units), the Guardtime infrastructure takes digital input records as inputs. These are then cryptographically hashed together in an iterative, preferably binary hash tree 501, ultimately yielding an uppermost hash value (the "calendar value" CAL 520) that encodes information in all the input records. It then returns a signature in the form of a vector, including, among other data, the values of sibling nodes in the hash tree that enable recomputation of the calendar value if a purported copy of the corresponding original input record is in fact identical to the original input record. The calendar values themselves may then be combined using a Merkle hash tree to form a single highest hash value that may be published in a tamper-proof form (such as by publication in a mass-distributed or at least publicly viewable document). As long as it is formatted according to specification, almost any set of data, including concatenation or other combination of multiple input parameters, may be submitted as the digital input records, which do not even have to comprise the same parameters.

To illustrate: Consider the shaded input hash tree node 510, which may represent a digital input record R such as a token (possibly with other or fewer parameters). Note that a real Guardtime hash tree will typically have very many more input nodes, at least one for each digital input record, and thus many more levels of hash computations. A signature (simplified) vector for the input record R could then be $\{a, b, c, CAL\}$. This establishes a computation path from R to CAL as follows: Let $g(x, y)$ be the hash function, having left, right input parameters x and y, applied to form each node. Observe that $g(a, R)=A$, then $g(b, A)=B$, then $g(B, c)=CAL$. Now assume that a record R* is presented as being identical to R. This can be proven or disproven by applying the same signature vector to R*: $R^*=R$ iff $g(g(b, g(a, R)), c)=CAL$. Now if each calendar value CAL is computed according to a known time relationship, such as once per second, then each signature will also correspond to time in that recomputation will lead to a CAL value that represents one calendar period, that is, one time.

One advantage of using a Guardtime infrastructure to timestamp tokens is already mentioned above: There will be no need to store and maintain PKI key pairs anywhere, in particular, not in the device—the Guardtime system may be configured to be totally keyless. Another advantage is less apparent: Given the signature vector for a current, user-presented token and knowledge of the hash function g used in the hash tree, the device 300, for example, the token verification module 360, will be able to verify (through hash computations as indicated by the signature vector) that all the data in a signed token is correct even without having to access the signature/timestamping system 500 at all. If the token includes not only the current password, but also a token time value (time of issuance, validity period, etc.) and a signature vector that encodes that time value, and the user submits to the device 300 these three parameters (at least) as well, then the device will be able to confirm that the parameters the user submits are valid, by reconstructing the same input record, applying the signature, and ensuring that this leads to the same CAL value as in the signature vector.

As FIG. 1 shows, the different devices 100 and 300 include typical hardware and software components such as one or more processors 120, 320, some form of system software such as an operating system 130, 330 (and/or any form of hypervisor in systems that support virtual machines), and some non-volatile memory and/or persistent storage media that store the non-transitory, processor-executable code that embodies the various software modules such as the token module 160 and the token verification module 360. The user system 200 will have similar components, but these are not illustrated specifically. All of the network-connected systems 100, 200, 300, 400, 500 will also include conventional connection and data-transfer devices or circuitry, such as a network interface card.

The administrative system 100 is shown as having memory 140 separate from disk storage 145, whereas the device 300 is shown as having these technologies combined as 340. Both options may be used, especially given that many modern storage devices are implemented as solid-state, flash devices. The protected device 300, however, also includes the device 315 that includes the one-time writable device 310 such as fuses. As mentioned above the device 315 may in some cases be the same as or a component of the processor chip 320 itself.

Mitigation of Attacker Interception

Even as described above, embodiments of the invention improve on the prior art by the use of the one-time-writable device 310. Nonetheless, other embodiments may reduce the risk of successful, unauthorized use even further.

By way of example, assume that the token is intercepted by an attacker before the intended user has a chance to receive and use it (which would cause a fuse to be set, thereby making a copy of the token useless). The rightful user might detect this situation when he later tries to use the token himself and is denied, but by then the attacker may have caused whatever damage he wanted. To mitigate this risk, according to one embodiment, two tokens may be used: A first token is issued at the request of the "good" user, whose identify is confirmed using any known method. When the good user submits the first token to the device 300, he receives back a unique value that is associated with the action he wants to perform (for example, it might contain a salted hash of a new password). The good user then gives this unique value back to the administrator 100, which issues a second token that tells the device 300 to finalize the action. The device would then set the appropriate fuse bit to prevent a replay of this sequence.

If an attacker intercepts the first token, he would now also need to steal the identity of the good user in order to get the second token, which would be required to cause some unauthorized action. If the attacker intercepts only the second token, however, it will do him no good because he will not know the good user's new, device-generated password.

What is claimed is:

1. A method for controlling access to a protected device, comprising:
   iteratively computing a series of passwords as respective results of a chain of evaluations of a hash function beginning from a private key value and continuing iteratively to a final, public key value;
   forming a current token including a current password chosen as a current one of the series of passwords;
   receiving, by the protected device, the current token;
   testing, within the protected device, the validity of the current password by computing a sub-chain of at least one evaluation of the hash function until a revealed value is obtained, said current password being valid if the revealed value is the same as the final, public key value;
   performing an action within the protected device corresponding to the current token only if the current password is valid; and
   indicating receipt by the protected device of the current token and thus also the current password by physically and permanently altering the state of at least one unit of a one-time programmable hardware device within the protected device, thereby incrementing a count entry indicating the number of tokens received by the protected device, said count entry also indicating how many evaluations of the hash function are required to yield the revealed value.

2. The method of claim 1, in which the public key value is stored in the one-time programmable hardware device.

3. The method of claim 2, in which:
   the revealed value is the public key value; and
   the validity of the current password is tested using the current password as an input value to the sub-chain of hash function evaluations, said current password being considered valid if, after iteratively hashing the current password n+1 times, where n corresponds to the number of tokens received by the protected device before the current password, the result is the public key value.

4. The method of claim 1, in which the revealed value is a previously received valid password.

5. The method of claim 1, in which the one-time programmable hardware device is a CPU fuse structure.

6. The method of claim 5, in which the CPU fuse structure is incorporated in the processor.

7. The method of claim 1, in which the one-time programmable hardware device is a CPU anti-fuse structure.

8. The method of claim 7, in which the CPU anti-fuse structure is incorporated in the processor.

9. The method of claim 1, in which the current token also includes an indication of a desired user-selected action corresponding to the current password and to be performed by the protected device upon validation by the protected device of the current password.

10. The method of claim 1, in which:
    the current token also includes an indication of an administrator-authorized action corresponding to the current password and to be performed by the protected device upon validation by the protected device of the current password; and
    the action performed by the protected device upon validation of the current password is limited to the administrator-authorized action.

11. The method of claim 1, further comprising verifying, within the protected device, a digital signature associated with the received current token, said digital signature having been determined before passing the current token to a user for submission to the protected device and performing the action corresponding to the current password only if the digital signature is verified.

12. The method of claim 11, in which the digital signature is generated by a keyless, distributed, hash-tree signing infrastructure, whereby the digital signature includes values enabling recomputation of an original computation path from an input value including the current token, through the hash-tree signing infrastructure, to an uppermost hash value in the infrastructure.

13. The method of claim 1, further comprising verifying, within the protected device, a timestamp associated with the received current token, said timestamp having been determined before passing the current token to a user for submission to the protected device, and performing the action corresponding to the current password only if the timestamp is verified.

14. The method of claim 1, in which the current token includes a time indication and the action is performed only if the time indication in the current token meets an acceptability criterion.

15. The method of claim 1, in which the current token includes an indication of the identity of a user from which the current token is received, said action being performed only if the identity of the user is authenticated.

16. A protected device comprising:
    a processor,
    a one-time programmable storage device;
    a token verification module configured
       to input a current token, said current token including a current password, said current password being a current one of a series of passwords computed iteratively as respective results of a chain of hash function evaluations beginning from a private key value and continuing iteratively to a final, public key value;
       to test the validity of the current password by computing a sub-chain of at least one evaluation of the hash function until a revealed value is obtained, said current password being valid if the revealed value is the same as the final, pubic key value;
       to cause the protected device to perform an action corresponding to the current token only if the current password is valid; and
       to indicate receipt of the current password by physically and permanently altering the state of at least one unit of the one-time programmable storage device, thereby incrementing a count entry indicating the number of tokens received and thus how many evaluations of the hash function are required to yield the revealed value.

17. The device of claim 16, in which the public key value is stored in the one-time programmable storage device.

18. The device of claim 17, in which:
    the revealed value is the public key value; and
    the token verification module is further configured to test the validity of the current password using the current password as an input value to the sub-chain of hash function evaluations, said current password being considered valid if, after iteratively hashing the current password n+1 times, where n corresponds to the number of tokens input before the current password, the result is the public key value.

19. The device of claim 16, in which the revealed value is a previously received valid password.

20. The device of claim 16, in which the one-time programmable hardware device is a CPU fuse structure.

21. The method of claim 20, in which the CPU fuse structure is incorporated in the processor.

22. The device of claim 16, in which the one-time programmable hardware device is a CPU anti-fuse structure.

23. The method of claim 22, in which the CPU anti-fuse structure is incorporated in the processor.

24. The device of claim 16, in which the token also includes an indication of a desired user-selected action corresponding to the current password, said desired user-selected action being the action performed by the protected device if the current password is valid.

25. The device of claim 16, in which:
the current token also includes an indication of an administrator-authorized action corresponding to the current password, said administrator-authorized action being the action performed by the protected device if the current password is valid.

26. The device of claim 16, in which the token verification module is further configured to verify a digital signature associated with the received current token, and to cause the protected device to perform the action corresponding to the current password only if the digital signature is verified.

27. The device of claim 26, in which:
the digital signature is generated by a keyless, distributed, hash-tree signing infrastructure, said digital signature including values enabling recomputation of an original computation path from an input value including the current token, through the hash-tree signing infrastructure, to an uppermost hash value in the infrastructure; and
the token verification module is further configured to verify the digital signature by carrying out the recomputation based on the values in the digital signature associated with the current token.

28. The device of claim 16, in which the token verification module is further configured to verify a timestamp associated with the received current token, and to cause the protected device to perform the action corresponding to the current password only if the timestamp is verified.

29. A system for protecting a protected device comprising:
an administrative system that includes:
a hash chain generation module; and
a token generation module;
a trusted storage device;
said hash chain generation module generating a sequence of passwords by iterative evaluations of a hash function that is initiated from a private key value and continues to a final, public key value;
said trusted storage device stores the private key value, a value indicating the total number of passwords in the sequence, and a value indicating how many passwords have been consumed; and
said token generation module forming a token that includes a current one of the passwords and said token upon receipt by the protected device, causes the protected device to increment an entry in a one-time programmable hardware device, in which the public key value is stored, said validation comprising computation, until a revealed value is obtained, of a sub-chain of at least one evaluation of the hash function by a number of times determined as a function of the total number of passwords in the sequence and of the value indicating how many passwords have been consumed, which corresponds to the entry in the one-time programmable hardware device, said protected device being enabled to perform a current action only if the revealed value is the same as the final, public key value.

30. The system as in claim 29, in which the trusted storage device is incorporated in the administrative system.

31. The system as in claim 29, in which the administrative system is configured to obtain a digital signature for each generated token by submitting the token as an input to a signature system, said validation including verifying the digital signature.

32. The system of claim 29, in which:
the digital signature is generated by a keyless, distributed, hash-tree signing infrastructure, said digital signature including values enabling recomputation of an original computation path from an input value including the current token, through the hash-tree signing infrastructure, to an uppermost hash value in the infrastructure; and
said verification includes carrying out the recomputation based on the values in the digital signature associated with the current token.

33. The system of claim 29, in which the one-time programmable hardware device is incorporated within a processor within the protected device.

34. The system of claim 33, in which the one-time programmable hardware device is a CPU fuse structure.

35. The system of claim 33, in which the one-time programmable hardware device is a CPU anti-fuse structure.

* * * * *